United States Patent
Herchenbach et al.

(10) Patent No.: US 6,966,838 B2
(45) Date of Patent: Nov. 22, 2005

(54) PROTECTION ARRANGEMENT FOR A JOINT, ESPECIALLY A DOUBLE UNIVERSAL JOINT

(75) Inventors: Paul Herchenbach, Ruppichteroth (DE); Herbert Coenen, Königswinter (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/282,395

(22) Filed: Oct. 29, 2002

(65) Prior Publication Data

US 2003/0109316 A1 Jun. 12, 2003

(30) Foreign Application Priority Data

Nov. 5, 2001 (DE) .......................................... 101 53 822

(51) Int. Cl.⁷ ................................................. F16D 3/84
(52) U.S. Cl. ........................................ 464/17; 464/175
(58) Field of Search .......................... 464/17, 171, 172, 464/173, 175; 56/DIG. 24

(56) References Cited

U.S. PATENT DOCUMENTS

| | | | |
|---|---|---|---|
| 2,952,142 A | | 9/1960 | Schroter et al. |
| 4,605,332 A | | 8/1986 | Mayhew et al. |
| 4,716,814 A | * | 1/1988 | Yamakoshi |
| 5,145,191 A | * | 9/1992 | Stewart et al. .......... 464/175 X |
| 5,346,431 A | * | 9/1994 | Okuyama et al. .......... 464/171 |
| 5,964,076 A | * | 10/1999 | Loehr .................... 56/DIG. 24 |
| 5,971,858 A | | 10/1999 | Aurora |
| 2003/0000327 A1 | * | 1/2003 | Mototani et al. |

FOREIGN PATENT DOCUMENTS

| | | | | |
|---|---|---|---|---|
| AU | 18328 | * | 7/1935 | .................. 464/175 |
| DE | 2 046 236 | | 4/1971 | |
| DE | 7 322 406 | | 10/1974 | |
| DE | 3033-850 | * | 3/1982 | .................. 464/175 |
| DE | 431-676 A | * | 6/1991 | .................. 464/175 |
| EP | 0 641 946 A1 | | 3/1995 | |
| GB | 952 078 | | 3/1964 | |
| GB | 2 047 372 | | 11/1980 | |

* cited by examiner

Primary Examiner—Greg Binda
(74) Attorney, Agent, or Firm—Harness, Dickey & Pierce P.L.C.

(57) ABSTRACT

A protection arrangement for a joint (1), especially a double universal joint driving or in drives of agricultural devices and self-propelled implements, has a tube-like first protection element (12) with a first axial end (13) and a second axial end. At least the first axial end (13) is open. An attachment portion (16) is on the first axial end (13). The first protection element (12) is supported on a first component (4) of the joint (1). A second plastic protection element (17) is formed as a hollow body. The second protection element is open at both ends with an axially open first end portion (18) and an axially open second end portion (19). An envelope portion (20, 120, 220) is formed between the first and second open end portions (18,19). The envelope portion (20, 120, 220) has a lattice structure. The first end portion (18) is connectable to the attachment portion (16) of the first protection element (12). The second end portion (19) connects to a connecting element (7), which is supported on a second component (6) of the joint (1).

7 Claims, 2 Drawing Sheets

PROTECTION ARRANGEMENT FOR A JOINT, ESPECIALLY A DOUBLE UNIVERSAL JOINT

CROSS-REFERENCE TO RELATED APPLICATIONS

This application claims priority to German Patent Application No. 10153822.7 filed Nov. 5, 2001, which application is herein expressly incorporated by reference.

DESCRIPTION

The invention relates to a protection arrangement for a joint, especially, a double universal joint for driving or in drives of agricultural devices or selfpropelled implements. These protection arrangements provide a contact protection and are kept stationary by connecting means, so that the joint is covered by and rotates within the protection arrangement.

Many design variants of protection arrangements are known. DE-OS 2 046 236 describes a protection arrangement, where a first protection element is arranged to the housing of a universal joint. The arrangement is rotationally supported on the housing. A protection cone is arranged to the connection yoke of the double universal joint. A further protection arrangement, which also comprises an enlarging cone-like protection element, is arranged on the joint yoke, which is connected with the profiled shaft. This protection element overlaps the first protection element, which is connected to the housing, and engages itself in the protection cone. When large deflections occur, complete overlapping is not present. Gaps occur between the protection elements, which would enable an insertion of a foreign object.

One construction, comparable to the above construction, is described in DE 7 322 406 U. Here, several bell-shaped protection elements are nested into each other. This prevents an insertion of a foreign object. Such a construction comprises four adjustable elements. However, it is cumbersome and is not suitable for the practical work.

U.S. Pat. No. 4,605,332 describes a protection arrangement for a double universal joint. The housing of the double universal joint supports a first protection element. The element has a hollow sphere-like portion which receives a ball-like element of a second protection element. The ball like element is supported on a connection element received on a joint yoke. The connection element connects with a protection tube. The tube covers the telescoping profile connected to the joint yoke. Also here, at large deflections between the two ball-like portions of the protection elements it is possible to produce a gap which would enable insertion of a foreign object.

To prevent any contact, a complete protection device is described in EP 0 641 946 A1. Here a single joint is completely covered by a bellow which is connected to a stationary connection element. It has been shown that, such complete encased protection arrangements are unsuitable for use in agricultural devices and self-propelled implements. Here dust can enter the protection arrangement so that a dragging of the protection arrangement in the rotational direction can occur.

SUMMARY OF THE INVENTION

The invention has an object to propose a protection arrangement, which prevents an outside insertion of a foreign object and ensures that dirt that has entered the internal space of the protection arrangement can exit.

The object is solved according to the invention by a joint protection arrangement, especially a double universal joint driving or in drives of agricultural devices and self-propelled implements that includes a tube-like first protection element. The tube-like first projection element has a first axial end and a second axial end. At least the first axial end is open and has an attachment portion on the first axial end. The first axial end is supported on a first component of the joint. A second plastic protection element is formed as a hollow body. The second protection element is open at both sides with an axially open first end portion and an axially open second end portion. A circumferentially extending envelope portion is formed between both open end portions. The envelope portion has distributedly formed through holes or a lattice structure. The first end portion is connectable with the attachment portion of the first protection element. The second end portion connects with a connecting element. The connecting element is supported on a second component of the joint.

An advantage of this construction is that, via the lattice structure, the dirt that has entered into the internal space at the joint components can exit. Furthermore, the dimensions of the lattice structure can be selected such that an insertion of a foreign object is not possible. The lattice structure or the formation of through holes provide the necessary flexibility so that an adaptation is ensured at large deflections. Furthermore, via the lattice structure, it is also possible to achieve a stationary connection between the first protection element and the connection element, to which the second protection element is connected. A torque (drag torque) can be sufficiently supported via the lattice structure.

In an embodiment of the invention, the lattice structure of the envelope portion, in an unrolled condition, is formed by parallel first webs and parallel second webs, which intersect each other in nodal points. The first webs and the second webs are connected to each other at nodal points. Thus, the webs are formed integrally. Furthermore, it is possible to form the lattice structure such that the envelope portion has through holes arranged in a pattern. These through holes may be formed as circular, oval, rhombic or elongated holes. Preferably, the first end portion has a larger diameter than the second end portion. The first end portion of the second protection element can advantageously be positively (form-fittingly) connected with the attachment portion of the first protection element. Thus, the attachment portion can have, for example, a collar, which is overlapped by the correspondingly formed first end portion of the second protection element. In order to connect the second end portion of the second protection element with a connection element mounted on the joint, the second end portion has an axially extending slot. In the circumferential direction, an enlargement with a bore for the insertion of a screw is provided at both ends of the protection element.

In the assembled condition an arrangement for the envelope portion can be chosen such that the envelope portion forms a fold in longitudinal section. Accordingly, in a deflected state of the first protection element or, of the attachment portion, respectively, in relation to the second end portion of the second protection element sufficient material is present to enable shortening, by rolling-in, and elongation, by stretching.

An especially advantageous embodiment is achieved when the through holes are distributed in the circumferential direction of the envelope on a circumferential line. Thus, rows are formed in axial direction. Accordingly the through holes, which belong to different rows, are off-set with respect to one another in the circumferential direction of the envelope. The drag torques, which are produced during the rotation of the joint, can advantageously be absorbed by such an arrangement. An advantageous deformation of the envelope can be achieved when ribs are arranged in the circumferential direction on the internal and/or external circumference.

Additional objects and advantages of the present invention will become apparent from the detailed description of the preferred embodiment, and the appended claims and accompanying drawings, or may be learned by practice of the invention.

BRIEF DESCRIPTION OF THE DRAWINGS

The arrangement of a protection arrangement according to the invention in reference to a joint in form of a double universal joint in the longitudinal section of the components belonging to the protection arrangement is shown in the drawings.

DETAILED DESCRIPTION OF THE PREFERRED EMBODIMENTS

Figure 1:
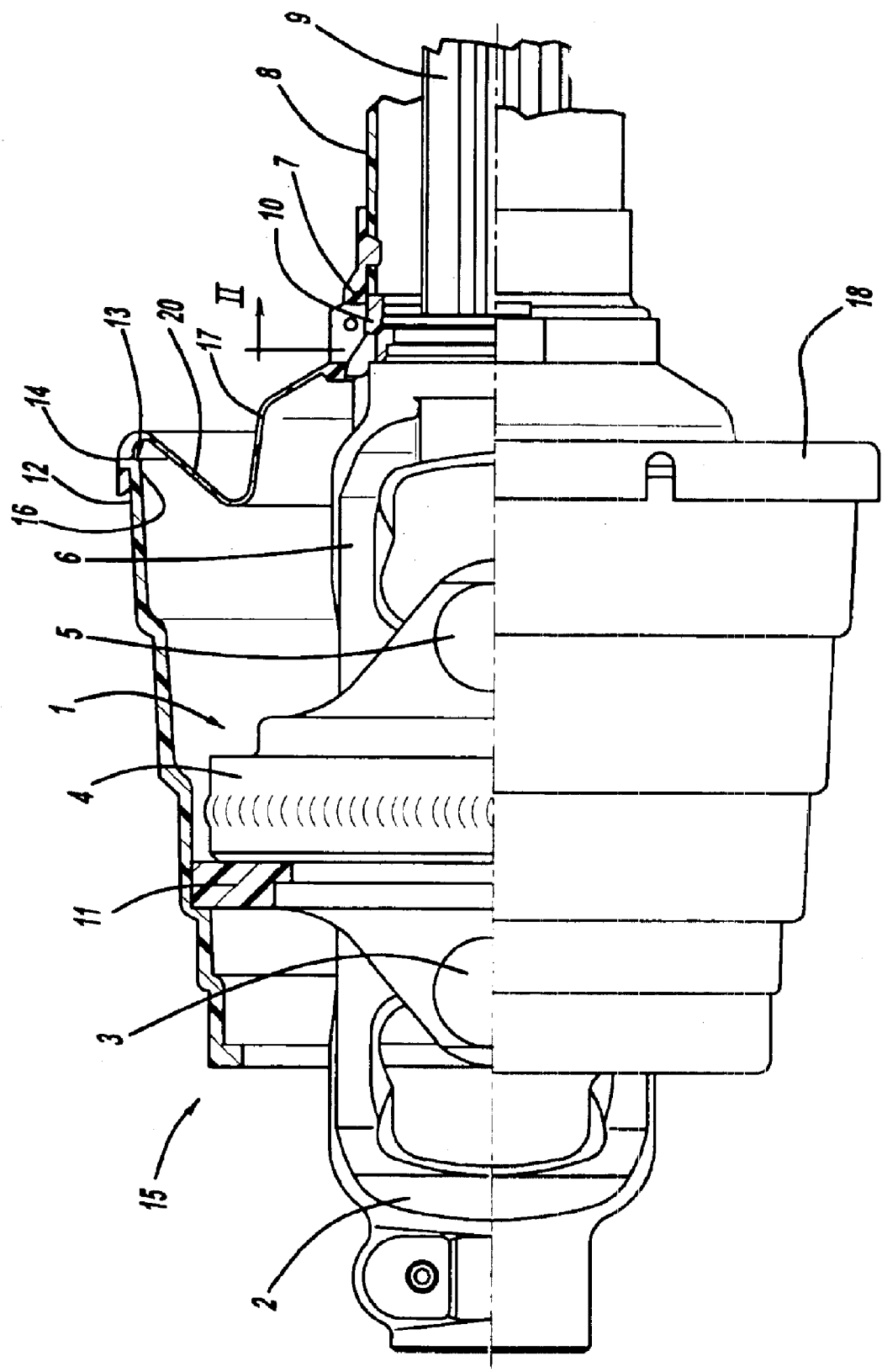
FIG. 1 is a longitudinal section view of the protection arrangement on a double universal joint.

FIG. 1 shows a joint 1 in the form of a double universal joint, half in a longitudinal section and half as a side view. A connecting yoke 2 is connected to the corresponding joint yoke of a housing 4 by a first cross 3. The housing 4 is, again, connected by a second cross 5 with the joint yoke 6. In the description the housing 4 is the first component of the joint and the joint yoke 6 is the second component. The joint yoke 6 is connected with a profiled tube 9. A torque is, for example, transmitted via the connecting yoke 2, the two crosses 3, 5 and the housing 4 onto the joint yoke 6. From there, via the profiled tube 9, the torque is transmitted onto a corresponding arrangement including a universal joint by a further profiled tube, which is displacably inserted into the profiled tube 9.

In agricultural devices and self-propelled implements such a driving arrangement often is open to the environment. Accordingly, protection arrangements are provided when the driving arrangement transmits the rotation from the power take-off shaft of a tractor to the implement. These protection arrangements are formed as stationary protection arrangements. The protection arrangements are supported by the joint arrangement, however, they do not rotate within the joint arrangement since they are connected with a stationary part of the device. The components belonging to the complete protection arrangement are connected with each other such that they produce a stationary (non-rotational) connection. Thus, all components are stationary.

A connecting element 7 is mounted on the joint yoke 6. The connecting element 7 connects with an inner protection tube 8, which overlaps the profiled tube 9. The connecting element 7, via a bearing ring, is supported on the joint yoke 6. The bearing ring engages in a groove of the joint yoke 6. The connecting element 7 has a seat face 10.

The first protection element 12 is supported by a bearing ring 11 on the housing 4. The housing 4 has a groove which is engaged by the bearing ring 11. The first protection element 12 has a first axial end 13 and distanced thereto a second axial end 15. The first projection element 12 is formed tube-like and has, in the present embodiment, a diameter that decreases from the first axial end 13 to the second axial end 15. On the first axial end 13 a collar 14 is directed to the outside. The collar 14 belongs to the attachment portion 16 of the first axial end 13.

A second protection element 17 is provided with a first end portion 18. The first end portion 18 is positively (form-fittingly) mounted on the attachment portion 16 of the first protection element 12. The second protection element has a second end portion 19 reduced in diameter. This second end portion 19 is retained on the seat face 10 of the connecting element 7. For retainment, the second end portion 19 is axially slotted.

Figure 2:
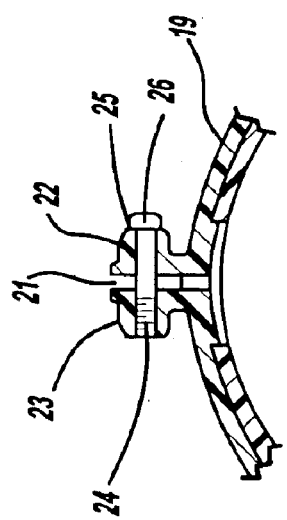
FIG. 2 is a sectional view along line II—II of FIG. 1 through the second end portion of the second protection element and the corresponding connection element.

The slot 21 can be seen in FIG. 2. In the circumferential direction at both ends of the slot 21 of the second end portion 19 an enlargement 22 or 23 is formed. The enlargement 22 or 23 have a bore 24 or 25, respectively, into which a self-tapping screw 26, for example, engages. It is, however, also possible, to axially notch the end portion 19 and retain the end portion by a clamping element in form of a tightening strap or of a cap.

The envelope portion 20 arranged between the first end portion 18 and the second end portion 19 has a lattice structure. The envelope portion 20 is folded, as can be seen from the longitudinal sectional view according to FIG. 1. The fold ensures rolling-in on the compressed side and stretching on the stretched side when bending (deflecting) of the connecting yoke occurs in relation to the joint yoke.

Figure 3:
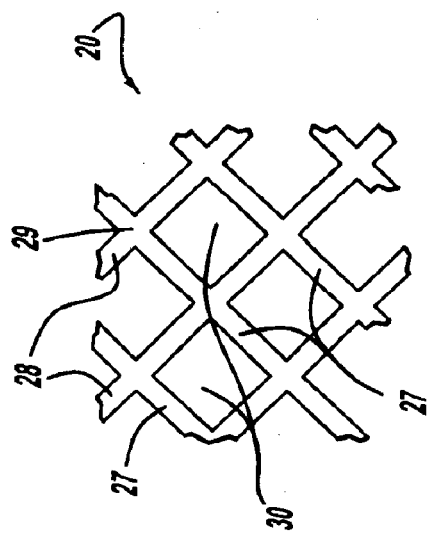
FIG. 3 is a plan view of a first embodiment of the lattice structure with rhombic through holes.
Figure 5:
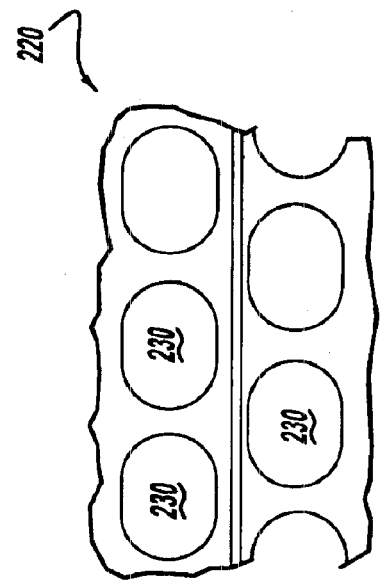
FIG. 5 is a plan view of a further modification of the lattice structure with elongated holes as through holes.
Figure 4:
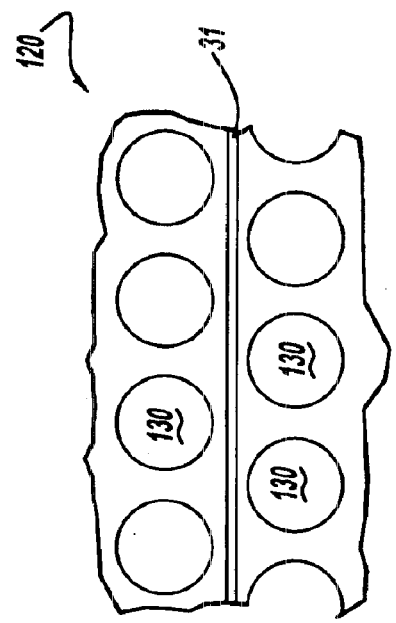
FIG. 4 is a plan view of a second embodiment of the structure with circular through holes and ribs.

The lattice structure of the envelope portion 20 and modifications thereto are represented in FIGS. 3 to 5. The modifications are described by the same elements, wherein the FIGS. 3 to 5 show, respectively, only portions of a developed (unrolled) view of the envelope portion 20. In the first embodiment the envelope portion 20 has first webs 27 extending parallel to each other. These webs 27 are intersected by second webs 28. The webs 28 extend parallel to each other. The first webs 27 and the second webs 28 intersect each other at nodal points 29. The nodal points are the connection points of the webs 27,28. The webs 27,28 enclose together rhombic through holes 30.

FIG. 4 shows a modified form of the structure of the envelope portion. The envelope portion of FIG. 4 is a modification according to FIG. 3 and is designated with reference numeral 120. The envelope portion has circular through holes 130. The circular through holes 130 are arranged in rows on circumferential lines of the envelope portion 120. The through holes of different rows are arranged to be off-set in circumferential direction. Furthermore, at least one rib 31 is arranged between two rows. The rib 31 is arranged on the external circumference of the envelope portion 120. Alternatively, it is possible, as represented in FIG. 5, to form an envelope portion 220 where the lattice structure has oval or elongated through holes 230. Here the lattice structure can be achieved such that the oval rings are manufactured integrally connected with each other. The second protection element formed like this, can be produced by means of injection molding from plastics.

While the above detailed description describes the preferred embodiment of the present invention, the invention is susceptible to modification, variation and alteration without deviating from the scope and fair meaning of the subjoined claims.

What is claimed is:

1. A protection arrangement for a joint of agricultural devices and self-propelled implements, comprising:

a tubular first protection element having a first axial end and a second axial end, at least said first axial end being open and having an attachment portion on the first axial end, said first protection element being supported at said second axial end on a first component of the joint;

a second plastic protection element having an axially open first end portion and an axially open second end portion, said second protection element having a circumferentially extending envelope portion formed between both open end portions;

said envelope portion forms, in longitudinal section, at least one fold and said envelope portion having distributedly formed through holes or a lattice structure within said at least one fold of the envelope portion enabling small dirt particles to exit through said through holes while preventing larger objects from entering through said through holes; and said first end portion of said second plastic protection element being connected with the attachment portion of the open first axial end of said first protection element, and said second end portion of said second plastic protection element connecting with a connecting element, said connecting element being supported on a second component of the joint.

2. The protection arrangement according to claim 1, wherein the lattice structure, in an unrolled condition of the envelope portion, is formed by parallel first webs and parallel second webs, said first and second webs intersect each other in nodal points.

3. The protection arrangement according to claim 1, wherein the lattice structure is formed such that the envelope portion has through holes arranged in a pattern.

4. The protection arrangement according to claim 3, wherein the through holes are circular, oval, rhombic or elongated holes.

5. The protection arrangement according to claim 3, wherein the through holes being distributed in the circumferential direction of the envelope on a circumferential line and form rows in the axial direction, said through holes, which belong to different rows, are off-set with respect to one another in the circumferential direction of the envelope.

6. The protection arrangement according to claim 1, wherein the first end portion has a larger diameter than the second end portion.

7. The protection arrangement according to claim 1, wherein at least one rib extends in a circumferential direction on a circumferential surface of the envelope.

* * * * *